Sept. 22, 1970 R. M. TUCK 3,529,492
POWER TRAIN HAVING A SINGLE INPUT, DUAL OUTPUT WITH MECHANICAL
AND HYDROSTATIC-MECHANICAL DRIVE
Filed Dec. 12, 1968
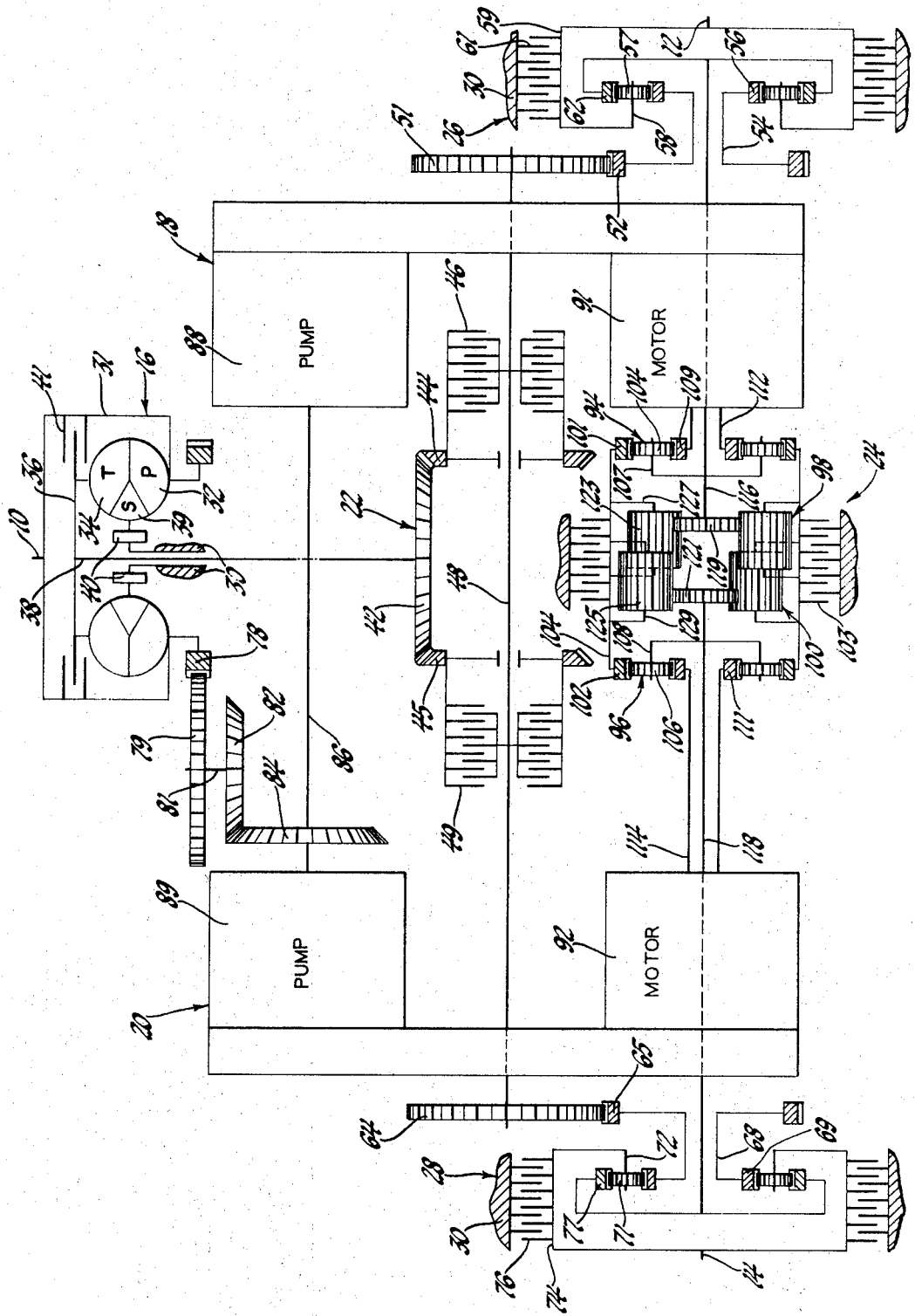
INVENTOR.
Robert M. Tuck
BY
Ronald L. Phillips
ATTORNEY

United States Patent Office 3,529,492
Patented Sept. 22, 1970

---

3,529,492
POWER TRAIN HAVING A SINGLE INPUT, DUAL OUTPUT WITH MECHANICAL AND HYDROSTATIC-MECHANICAL DRIVE
Robert M. Tuck, Indianapolis, Ind., assignor to General Motors Corporation, Detroit, Mich., a corporation of Delaware
Filed Dec. 12, 1968, Ser. No. 783,243
Int. Cl. F16h 37/06
U.S. Cl. 74—720.5                3 Claims

ABSTRACT OF THE DISCLOSURE

A single input, dual output, vehicular power train having a hydrodynamic torque converter, a pair of variable ratio hydrostatic drive units and three differential gear units combined to provide a low speed range drive with full power transmittal through the converter, a high speed range drive with hydrostatic-mechanical power transmittal and steering in each drive by hydrostatic operation.

---

This invention relates to power trains and more particularly to a single input, dual output power train providing full converter drive, hydrostatic-mechanical drive and hydrostatic steering operation in each drive.

The invention is illustrated in a power train for a track-laying vehicle, the power train comprising an input shaft which is connected to drive a hydrodynamic torque converter having a lockup catch. For low speed range drive, power is delivered through the converter to like speed differential units, which are connected to drive the power train output shafts with the reaction for this drive provided by a reaction-drive differential unit connected between the speed differential units, the reaction being selectively established by a brake incorporated in the reaction-drive differential unit. A pair of hydrostatic drive units provide separate drives from the input shaft to the reaction-drive differential unit so that on operation of one of these hydrostatic drive units there is provided drives of opposite direction to the speed differential units for steering in the low speed range. Alternatively, both of the hydrostatic drive units are operated to provide drives of opposite direction to the speed differential units for the same type of steering operation. A high speed range drive is provided by locking up the converter with the lockup clutch so that the speed differential units receive mechanical drive from the input shaft. Then on operation of the hydrostatic drives unit to provide drives of the same drive direction to the reaction-drive differential unit, the latter unit provides drives of the same direction as second input to the speed differential units which combine the two input drives to provide hydrostatic-mechanical output split power drive to the output shafts. Steering in the high speed range is provided by establishing a speed differential between the hydrostatic drives to the reaction-drive differential unit to establish speed differential between the output shafts. There is also provided a forward-reverse drive between the converter and the speed differential units so that the same drives and steering operation are provided in forward and reverse.

By this combination of drives, there is provided both infinitely variable speed ratio drive and infinitely variable steer ratio control for all operating conditions with the low speed range drive provided by full power transmittal through the converter and the high speed range drive provided by hydromechanical power transmittal. Moreover, the hydrostatic drive units are relieved of duty in the low range and therefore are not required to provide the starting and operating torque in this heavy duty range. Thus, the power capacity requirement for the hydrostatic drive units is lower than what it would be if the hydrostatic drive units were also required to transmit the power which is being transmitted by the converter in the low range.

An object of the present invention is to provide a new and improved power train.

Another object is to provide a single input, dual output power train having a hydrodynamic torque converter drive transmitting full power in a low speed range and a hydromechanical drive transmitting the power in a high speed range.

Another object is to provide a hydrodynamic torque converter, a pair of variable ratio hydrostatic drive units and three differential units combined to provide full converter drive to two outputs in a low speed range and hydromechanical drive in a high speed range with steering by hydrostatic operation in each range.

These and other objects of the invention will become more apparent from the following description and drawing which diagrammatically shows a power train arrangement according to the invention.

POWER TRAIN ARRANGEMENT

The invention is illustrated for use in a track-laying vehicular power train. The power train generally comprises a prime mover drive input shaft 10 operatively connected to drive a right and left track powering output shaft 12 and 14 by a hydrodynamic torque converter 16, a right and a left variable ratio hydrostatic drive unit 18 and 20, a forward and reverse drive unit 22, a reaction-drive differential unit 24 and a right and a left speed differential unit 26 and 28. All of these components are suitably supported in a housing 30 with the axis of the input shaft 10 arranged to extend longitudinally of the vehicle to provide what is referred to as a "T" input drive through converter 16 to the power train, the central axes of the components 18, 20, 22, 24, 26, 28, 12 and 14 arranged to extend transversely of the vehicle with the output shafts 12 and 14 being axially aligned. With this arrangement, the power train is operable to provide in both forward and reverse, a full converter drive in a low speed range and hydromechanical drive in a high speed range with steering in each range.

The power train input shaft 10 is connected by converter housing 31 to pump blading 32 (P), the converter housing being rotatably supported and providing a rotatable housing for the blading of the converter. The pump blading 32 exits to turbine blading 34 (T) which is connected by a hub 36 to a turbine or converter output shaft 38. Fluid is circulated toroidially in the converter and, as it leaves the turbine blading 34, it is redirected to the pump blading 32 by stator blading 39 (S) which stator blading is connected by a one-way brake 40 to the power train housing 30. The converter is a three element converter of conventional design and provides torque multiplication in the conventional manner. The converter has a lockup clutch 41 which, on engagement, provides a mechanical drive between input shaft 10 and converter output shaft 38 bypassing the converter's hydraulic power path.

The converter output shaft 38 is connected to drive bevel gear 42 of the forward and reverse drive unit 22. Gear 42 meshes at diametrically opposite sides with annular bevel gears 44 and 45 of the same size which latter two gears are thus driven by the former gear in opposite directions at the same speed. Gear 44 is connected by engagement of a forward drive clutch 46 in unit 22 to a power transfer shaft 48. Alternatively, the opposite gear 45 is connected by engagement of a reverse drive clutch 49 to the power transfer shaft 48 which is arranged to extend through gears 44 and 45 and transverse of the vehicle.

The power transfer shaft 48 transfers power to both of the speed differential units 26 and 28 which are of the planetary gear type. For this power transfer the shaft 48 is connected at its right end to a spur gear 51 which meshes with an annular spur gear 52. Gear 52 is connected by a sleeve shaft 54 to a sun gear 56 in the right speed differential unit 26. Sun gear 56 meshes with a plurality of pinions 57 carried by a carrier 58 which is connected by a drum 59 to the right output shaft 12. A right vehicle brake 61 is connected to brake the drum 59 and thus the right output shaft 12. The pinions 57 mesh with a ring gear 62 which is selectively held for reaction and driven as described in more detail later. Similarly, the left end of power transfer shaft 48 is connected to a spur gear 64 which meshes with an annular spur gear 65. Gear 65 is connected by a sleeve shaft 68 to an annular sun gear 69 in the left speed differential unit 28. Sun gear 69 meshes with a plurality of pinions 71 carried by a carrier 72 which is connected by a drum 74 to the left output shaft 14. A vehicle brake 76 is connected to brake the drum 74 and thus the left output shaft 14. Pinions 71 mesh with a ring gear 77 which is selectively held for reaction and driven as described in more detail later. The gear trains 51–52 and 64–65 are identical as are the planetary gear type speed differential units 26 and 28 for reasons which become more apparent later.

In the hydrostatic drive portion of the power train arrangement, the converter housing 31 is connected to an annular spur gear 78 which meshes with a spur gear 79. Gear 79 is connected by a shaft 81 to a bevel gear 82 which meshes at right angles with a second bevel gear 84 that is connected to a pump input shaft 86. The pump input shaft 86 is connected to drive the respective pumps 88 and 89 of the hydrostatic drive units 18 and 20. The pumps 88 and 89 are hydraulically connected to the respective motors 91 and 92 whose central axes are aligned with those of the output shafts 12 and 14.

The reaction-drive differential unit 24 is of the planetary gear type and provides a brakeable differential drive connection between the speed differential units 26 and 28 and in addition provides for connecting the hydrostatic drive units to the speed differential units. The unit 24 comprises a first pair of like planetary gear sets 94 and 96 and a second pair of like planetary gear sets 98 and 100.

The respective ring gears 101 and 102, in the like planetary gear sets 94 and 96, are connected to a rotatable drum 104 which is braked on engagement of a differential brake 103. The ring gears 101 and 102 mesh with pinions 104 and 106 which are carried by carriers 107 and 108, respectively, and mesh with annular sun gears 109 and 111. The sun gears 109 and 111 are connected to sleeve shafts 112 and 114, respectively, which are the outputs of motors 91 and 92 and provide inputs to unit 24. The carriers 107 and 108 are connected to the reaction-drive differential unit's output shafts 116 and 118 which extend through the sleeve shafts 112 and 114, motors 91 and 92 and sleeve shafts 54 and 68 and are connected to ring gears 62 and 77 of the speed differential unit 26 and 28, respectively.

The second like pair of planetary gear sets 98 and 100 have sun gears 119 and 121 which are connected to the inboard ends of the differential output shafts 116 and 118, respectively. The sun gears 119 and 121 mesh with pinions 123 and 125 which are carried by carriers 127 and 129, respectively, the carriers being connected to the rotatable drum 104. Each of the pinions 123 in gear set 98 meshes with one of the pinions 125 of the other gear set 100 to complete the arrangement in unit 24.

The hydrostatic drive units 18 and 20 are identical and of conventional design with each pump having a variable displacement and each motor having a fixed displacement, the speed and direction of the motor output being controlled by any suitable conventional pump displacement control mechanism.

The various brakes and clutches employed in the power train are conventional friction engaging devices of the multi-plate type. The devices which establish drive, thus excepting the vehicle brakes, may be actuated in any known way, e.g. electrically, hydraulically, pneumatically, or by some mechanical provision and according to a certain sequence. The preferred sequence for the drive establishing devices and operation of the hydrostatic drive units is described in the following illustrative description of operation.

OPERATION

The power train may be operated to provide two speed range drives in forward and reverse and hydrostatically controlled steering. For neutral, either of the directional drive clutches, forward drive clutch 46 or reverse drive clutch 49, may be engaged and all of the other drive establishing devices are disengaged to disconnect all power flow paths from the output shafts 12 and 14. In neutral, both of the pumps 88 and 89 are conditioned for zero displacement and thus do not deliver power to the respective motors 91 and 92.

The first and lowest speed range drive is established by engaging either one of the directional drive clutches, forward drive clutch 46 or reverse drive clutch 49, and the differential brake 103, all other drive establishing devices being disengaged. With power to input shaft 10, the converter output shaft 38 is driven by the hydraulic action of converter 16 and this drive is transmitted to drive the respective sun gears 56 and 69 of the speed differential units 26 and 28 in the same direction and at the same speed, the drive direction being determined by which directional drive clutch is engaged. With differential brake 103 engaged, the carriers 127 and 129 in the reaction-drive differential unit 24 are thus held and the reaction for the converter drive to the speed differential units 26 and 28 is taken from the differential sun gears 119 and 121 through their mesh with pinions 123 and 125. The reaction provides equal opposite meshing forces between the pinions 123 and 125 and the forces are transmitted to the grounded carriers 127 and 129. Thus, the motors 91 and 92 are freed of any reaction for this drive and the output shafts 12 and 14 are accelerated on acceleration of the converter output shaft 38 with full power transmittal by the converter.

In the first speed range drive either of the motors 91 and 92 may be driven by the respective pumps 88 and 89 to provide steer bias. For example, when the displacement of pump 88 in the right hydrostatic drive unit 18 is increased from zero so that motor 91 drives sun gear 109 in the reaction-drive differential unit 24, the pinions 104 in gear set 94 are caused to walk in the same direction at a reduced speed inside the braked ring gear 101. This causes carrier 107 to rotate in the same direction at a speed less than motor speed. The carrier 107 drives ring gear 62 of the right speed differential unit 26 in the same direction as sun gear 56 and thus adds to the forward speed of the right output shaft 12. In unit 24 the sun gear 119 is also driven with carrier 107 by motor 91 and thus causes the respective pinions 123 and 125 to revolve on their grounded carriers 127 and 129 and drive sun gear 121 at the same speed as sun gear 119 but in the opposite direction. Thus, the output speed of the left output shaft 14 is reduced by the same amount as the right output shaft 12 is increased. Since the motor output shaft 114 of the other motor 92 will rotate at the same speed the motor output shaft 112 is rotating but in the opposite direction by the action of gear set 96, the left hydrostatic drive unit 20 is conditioned so that the motor output shaft 114 is free to rotate. Alternatively, both of the hydrostatic drive units 26 and 28 may be used for this type of steering operation by operating these drive units so that they provide equal but opposite directional drives to the motor output shafts 112 and 114 recognizing that differential motor torque would produce fight between the motors.

The second and highest speed range drive is established by engaging one of the directional drive clutches 46 and 49 and the converter lockup clutch 41, all other drive establishing devices being disengaged. Thus, for an upshift from first to second speed range drive, the differential brake 103 is released and the converter lockup clutch 41 is engaged while the acting directional drive clutch remains engaged. With the converter lockup clutch 41 engaged, an all mechanical drive is provided from input shaft 10 to the respective sun gears 69 and 56 of speed differential units 26 and 28. At the beginning of the second speed range drive, if we assume equal drive loads on the output shafts 12 and 14, the equal geared drives to the sun gears 56 and 69 drive the pinions 57 and 71 causing the carriers 58 and 72 to be driven and the ring gears 62 and 77 receive equal drive. The sun gears 119 and 121 in unit 24 thus receive equal drive and this drive is received by the meshing pinions 123 and 125. Pinions 123 and 125 are thus fixed relative to each other and the relationship of sun gears 119 and 121 is fixed relative to the carriers 127 and 129 and the connected ring gears 101 and 102. Since sun gears 119 and 121 are connected to carriers 107 and 108, respectively, the planetary gear sets 94 and 96 are locked for unitary rotation and the fixed displacement motors 91 and 92 receive equal drive to pump fluid to the pumps 88 and 89. The pumps are set at zero displacement at the beginning of the second speed range drive and thus the reaction for equal drives of output shafts 12 and 14 is grounded equally by pumps 88 and 89. To vary the speed ratio in the second speed range drive, the displacements of the pumps 88 and 89 are simultaneously increased by the same amount to cause the motors 91 and 92 to drive the respective sun gears 109 and 111 at the same speed and in the same direction. This causes unitary rotation of the locked reaction-drive differential unit 24 and thus drive to the ring gears 62 and 77 of the speed differential units. In the high speed range drive the motor driven sun gears 109 and 111 increase the speed of the output shafts 12 and 14 by driving ring gears 62 and 77 in the same direction as the sun gears 56 and 69, it having been found desirable to increase rather than decrease the output speed through pump displacement control in this drive recognizing that a decrease in output speed is available by reversing motor output direction.

In the high speed range drive in either forward or reverse, steering is provided by establishing a differential in the displacements of the pumps 88 and 89 to thereby establish a differential in the reaction or input to the sun gears 109 and 111 from the motors 91 and 92, respectively. This differential movement within the planetary arrangement of the reaction-drive differential unit 24 effects a differential speed between the differential output shafts 116 and 118 which increases the speed of one of the power train output shafts 12 and 14 while decreasing the speed of the other power train output shaft by the same amount.

The above described preferred embodiment is illustrative of the invention which may be modified within the scope of the appended claims.

I claim:

1. In a power train the combination of an input shaft; a pair of output shafts; a hydrodynamic torque converter connected to be driven by said input shaft; a converter lockup clutch for selectively locking up said converter; speed differential means operatively connected to each said output shaft operable to drive the connected output shaft when provided with single input drive and reaction and also operable to drive the connected output shaft when provided with two input drives at a speed proportional to the speed differential of the two input drives; drive means for drivingly connecting said converter to both said speed differential means to provide single input drives thereto; reaction-drive differential means operatively connected to both said speed differential means operable when braked to provide both said speed differential output means with reaction and also operable when provided with a single input drive thereto to provide input drives of opposite drive directions to said speed differential means and also operable when provided with two input drives of opposite drive directions and the same speed thereto to provide input drives of opposite drive directions and the same speed to said speed differential means and also operable when provided with two input drives of the same drive direction and speed thereto to provide locked up differential drives of the same drive direction and speed to said speed differential means; a differential brake for braking said reaction-drive differential means; and a pair of variable ratio-two directional hydrostatic drive means operatively connecting said input shaft to said reaction-drive differential means for selectively providing single input drive, two input drives of opposite drive directions and the same speed and two input drives of the same direction and speed to said reaction-drive differential means.

2. The power train set forth in claim 1 and said drive means including forward and reverse drive means for selectively changing the directions of drive between said converter and both said speed differential means.

3. The power train set forth in claim 1 and said reaction-drive differential means comprising a pair of differential input shafts, a pair of differential output shafts, a rotatable drum and two pairs of like planetary gear sets; each of said differential input shafts connected to one of said hydrostatic drive means; each of said differential output shafts operatively connected to one of said speed differential means; said drum connected to said differential brake; each gear set of one pair having a sun gear, a ring gear, a carrier having a pinion meshing with said sun gear and ring gear, said sun gear connected to one of said differential input shafts, said ring gear connected to said drum and said carrier connected to one of said differential output shafts; each gear set of the other pair having a sun gear, a carrier having a pinion meshing with said sun gear, said carrier connected to said drum and said sun gear connected to one of said differential output shafts; and said pinion in one gear set of said other pair meshing with said pinion in the other gear set of said other pair.

References Cited

UNITED STATES PATENTS

| | | | |
|---|---|---|---|
| 3,060,765 | 10/1962 | Rinsoz | 74—710.5 |
| 3,377,885 | 4/1968 | Tuck et al. | 74—720.5 |
| 3,383,953 | 5/1968 | Christenson | 74—720.5 |
| 3,470,769 | 10/1969 | Livezey | 74—720.5 |

ARTHUR T. McKEON, Primary Examiner